United States Patent Office 3,490,540
Patented Jan. 20, 1970

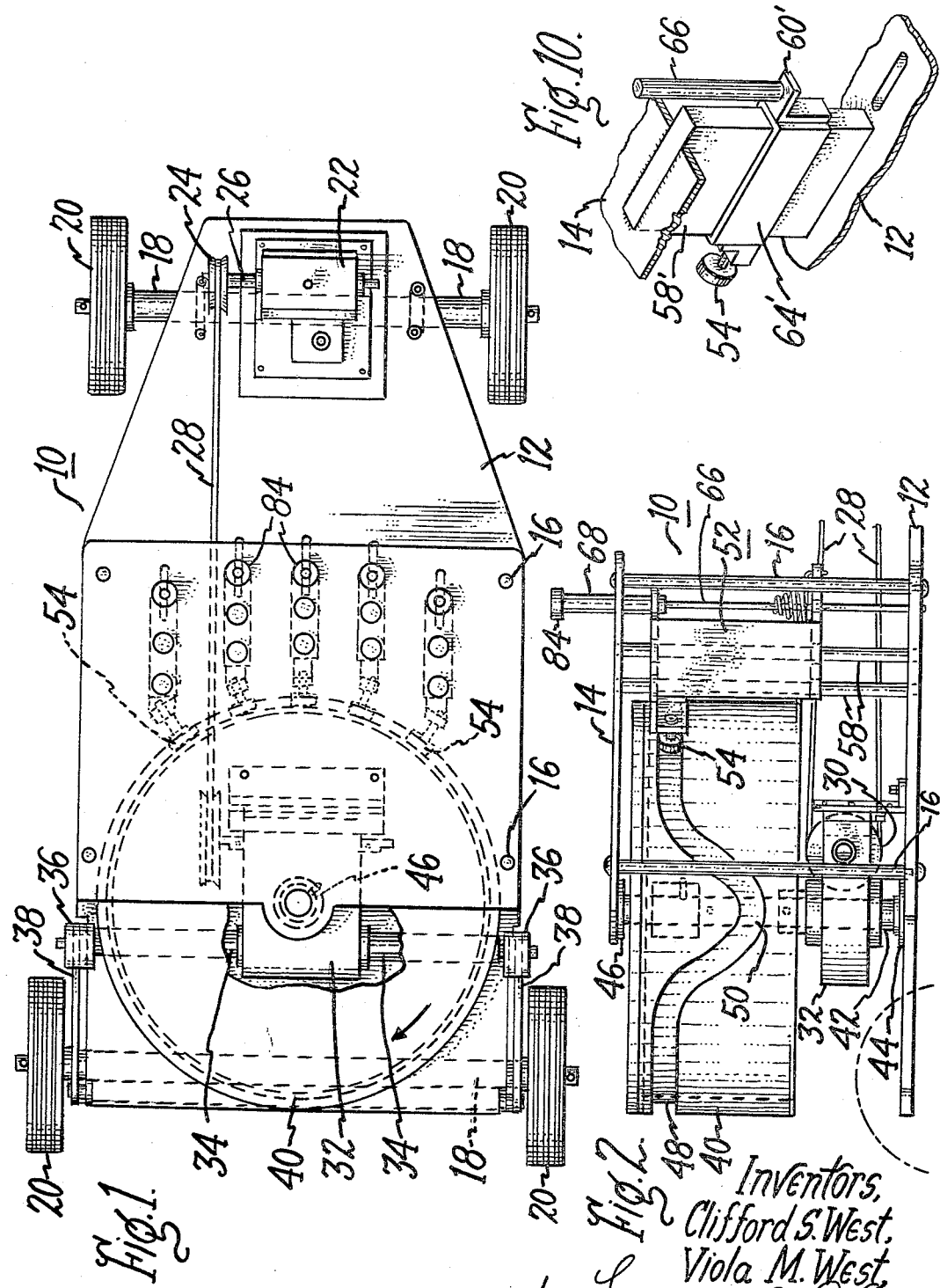

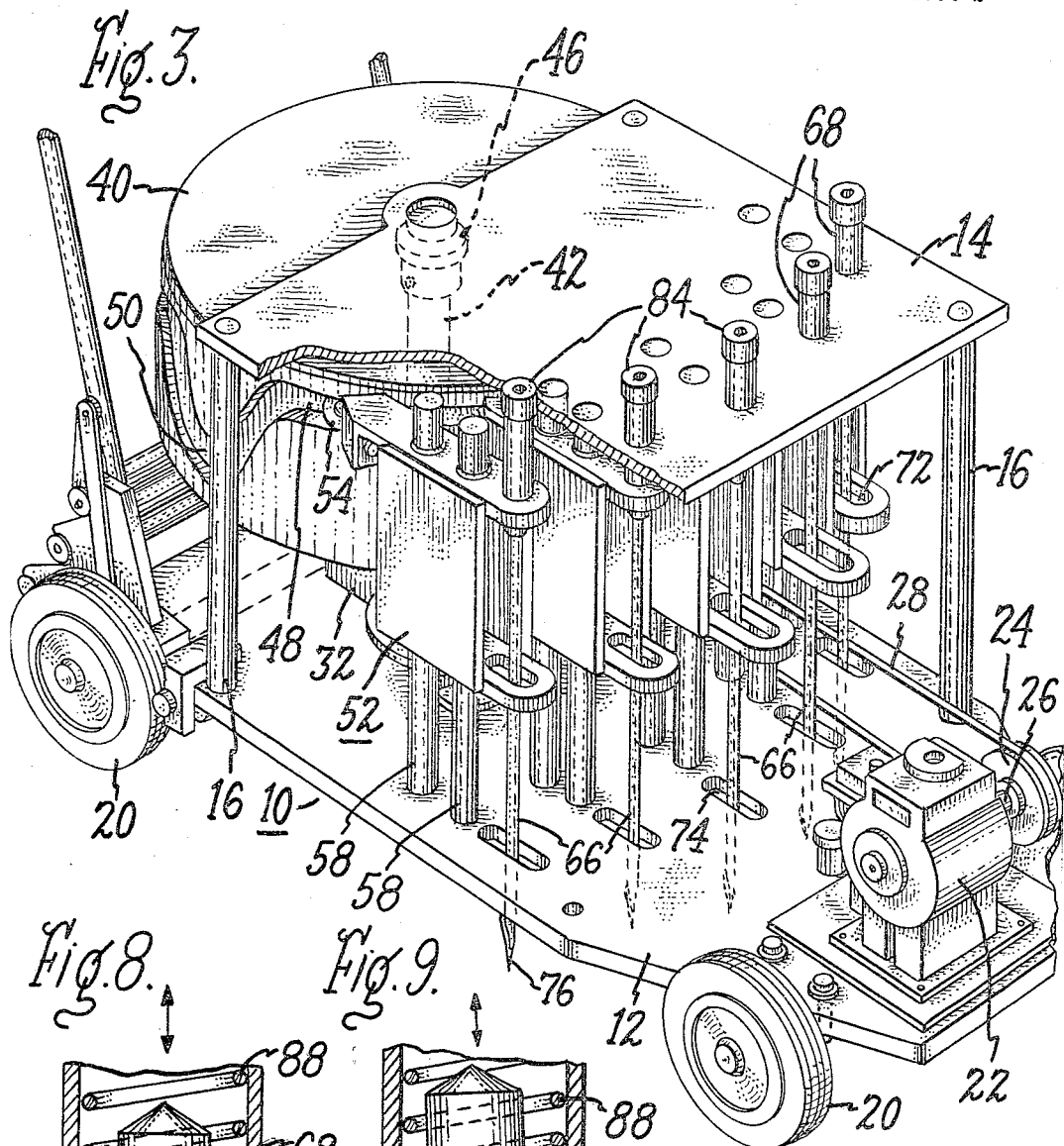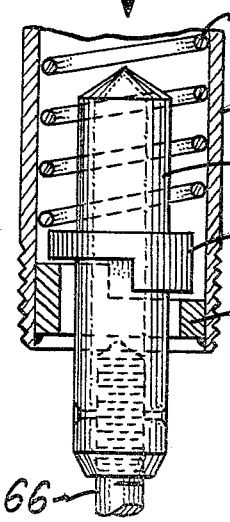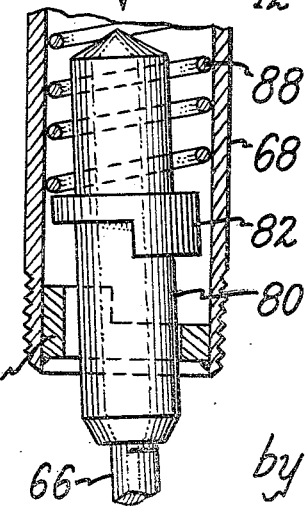

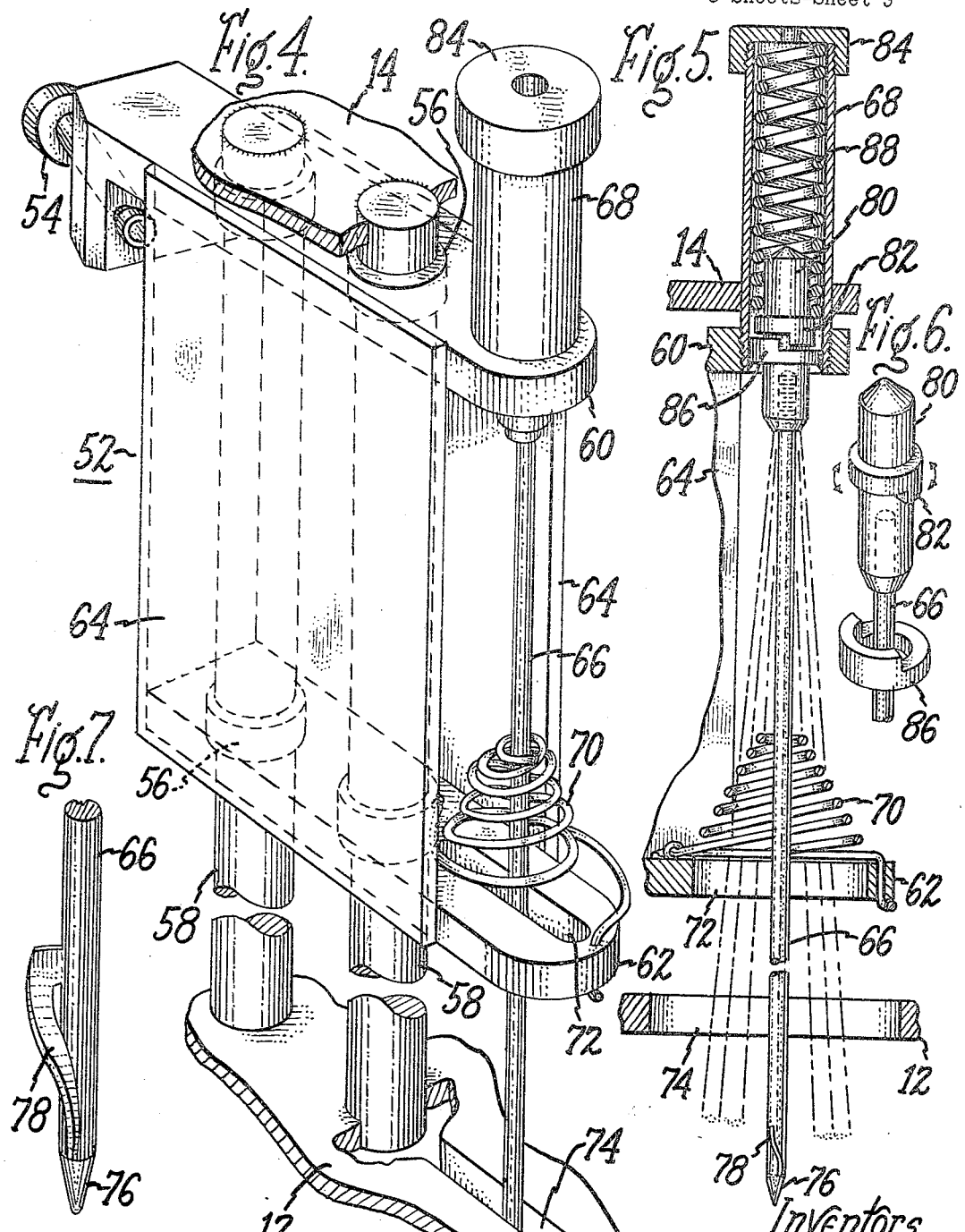

3,490,540
AERATOR HAVING SPRING MOUNTED TINES
Clifford S. West and Viola M. West, both of
1 Simon Ave., Adams, Mass. 01220
Filed Mar. 6, 1967, Ser. No. 620,905
Int. Cl. A01b 45/02, 61/04
U.S. Cl. 172—21                                    3 Claims

ABSTRACT OF THE DISCLOSURE

An aerator for lawns and the like having spring mounted tines secured in vertically movable platforms. Each platform has a cam follower which rides in a cam track on the periphery of a rotatable drum which is driven by a motor. The platforms ride up and down on guide members which are fixed to the frame of the aerator and carry tines into and out of engagement with the turf or sod. Each tine is provided with one or more blades to aid in loosening the soil about grass roots in the sod or turf. The spring mounting of the tines prevent damage to the tines when contacting rock or other solid substances in the soil. Also, the spring mounting aids in twisting the tines, together with the contour of the blade member as the tines enter the soil.

BACKGROUND OF THE INVENTION

This invention relates to an aerator, and more particularly, to a lawn aerator which is provided with spring mounted tines for loosening the soil about the roots of grass in sod or turf.

As is well known to those skilled in this art, when the soil about the roots of grass becomes very hard it is difficult for the grass to stay healthy. Usually, the grass begins to die due to lack of water and the like because these substances cannot penetrate the hard soil to the roots of the grass. It is very desirable to be able to loosen the soil about the roots and allow the grass to obtain nourishment. However, there is not presently any satisfactory device on the market to adequately loosen the soil. Of course, many devices are available in the prior art which will loosen the soil, such as that disclosed in Patent No. 3,136,274. However, these known devices are extremely complex, and therefore expensive. Also, many of these known devices do not provide for adequate loosening of the soil or for protecting the tines in the event they should strike a stone or other solid substance in the soil. In fact, some known devices actually tend to compress the soil where the tines penetrate. From the foregoing it will be apparent that there is presently a need in the aerator art for a simple, inexpensive device which will adequately loosen soil about the roots of grass and which will prevent damage to the tines should they strike solid material in the soil.

It is therefore a principal object of this invention to provide a simple, inexpensive aerator which may be easily made.

It is a further object of this invention to provide an aerator in which the tines are spring mounted to prevent damage to such tines when striking solid objects.

A still further object of this invention is to provide an aerator in which the tines are spring mounted and provided with blades to give a twisting motion to the tines penetrating the soil, while being fixed on removal therefrom to aid in loosening the soil.

In carrying out this invention in one form an aerator is provided which comprises a base frame on which is mounted wheels for moving the aerator. A motor is mounted on the frame and connected to rotate a rotatable drum type member which is also mouted on the frame. The rotatable drum type member is provided with a cam track on its periphery. Platform members are movably mounted on the frame on guide members secured to the frame to allow each platform to move in a vertical direction. These platforms are provided with cam followers which ride in the cam track on the rotatable drum type member. At least one tine having a blade member is spring mounted in each platform and moves up and down with the platform. When the drum type member is rotated the cam track revolves and, by means of the cam followers, drives each platform up and down, driving the tines into the soil over which the aerator passes. The tines twist or turn on entering the soil due to the interaction of the spring mounting and the blade contour, thus loosening the soil.

The invention which is desired to be protected will be clearly pointed out and distinctly claimed in the claims appended hereto. However, it is believed that this invention, and the manner in which its various objects and advantages are obtained, as well as other objects and advantages thereof, will be better understood from the following detailed description of a preferred embodiment, especially when considered in the light of the accompanying drawings.

BRIEF DESCRIPTION OF THE DRAWINGS

FIGURE 1 is a top view of an aerator according to a preferred embodiment of this invention;

FIGURE 2 is a side view of a preferred embodiment of the aerator shown in FIGURE 1;

FIGURE 3 is a perspective view, with parts broken away, of the aerator shown in FIGURES 1 and 2;

FIGURE 4 is a perspective view, on an enlarged scale, of one form of movable, tine-carrying platform, according to a preferred embodiment of this invention;

FIGURE 5 is a partial, sectional view showing the preferred means of spring mounting the tines;

FIGURE 6 is a perspective view of one form of plunger portion of the tines according to this invention;

FIGURE 7 is an enlarged perspective view of the bottom portion of a tine showing a preferred form of blade member;

FIGURE 8 is an enlarged, partial sectional view of the spring mounting shown in FIGURE 5, in one position;

FIGURE 9 is an enlarged, partial sectional view, similar to FIGURE 8, showing another position of the spring mounting; and FIGURE 10 is a perspective view, on a reduced scale, of another form of platform according to this invention.

DETAILED DESCRIPTION OF PREFERRED EMBODIMENT

This invention will now be described with reference to the preferred embodiment shown in the drawings. However, it is to be understood that this description is for illustrative purposes only and is not to be considered as limiting the invention, since it will be apparent to those skilled in this art that many changes may be made in the various details of the disclosure without departing from the spirit and scope of the invention.

Referring now to the drawings, and considering first FIGURES 1, 2, and 3, it can be seen that in the preferred embodiment of the aerator 10 of this invention, that the aerator 10 comprises a base frame which includes a lower plate 12 and an upper or cover plate 14. The cover plate 14 is spaced from and secured to the lower plate 12 by a plurality of spacers 16. Axles 18 are secured in any desired manner to the lower plate 12 and are provided with wheels 20 for moving the aerator 10 over the ground, as will be readily understood. The wheels 20 are preferably equipped with rubber tires, as shown, to prevent damage to the grass when in use. The design of the base frame and wheels may be as desired to provide an attractive device.

A motor 22 is provided, preferably mounted on the lower plate 12, as shown. The motor 22 can be either gas or electric as desired, a 2 cycle gas engine being shown for purposes of illustration. A drive pulley 24 is provided, mounted on the drive shaft 26 of motor 22 to provide the motive power of the aerator 10. A drive belt 28 is entrained over pulley 24 and also over a driven pulley 30, which in turn is connected to drive a gear train (not shown) disposed in gear housing 32. As will be understood, the gear train will be designed to provide the desired motive power to the aerator 10, in accordance with the particular requirements of the various uses for the aerator 10. A driven shaft 34 extends from one or both sides of the gear housing 32 and is provided with pulleys 36 for driving the wheels 20, through belts 38, as shown.

A drum type member 40 is rotatably mounted on the base frame of the aerator 10. The drum 40 is preferably fixed to a rotatable shaft 42 which is rotatably mounted in bearings 44 on lower plate 12 and bearing 46 on upper plate 14. Shaft 42 extends through gear housing 32 and is rotated by the gear train (not shown) therein, in a well known manner. Drum 40 is provided with a cam track 48 on the periphery thereof, the cam track 48 having one or more dips or depressions 50 for actuating the tines of aerator 10, as will be more fully described hereafter. As can be seen from the drawings, the cam track 48 is substantially horizontal about the drum 40, with one or more dips 50, as shown.

If desired, a pair of formed disks could be substituted for the drum 40. The disks would be mounted such that the spacing between their contours could be used for the cam track. Also, it will be clear that a vertically mounted motor could be used in place of the horizontal mounting shown. With a vertical mounting a direct drive could be provided to a pulley on the drum or disks. Obviously, the ratio between the motor drive shaft pulley and the pulley on the drum or disks could provide any desired drive ratio, replacing the gear train.

As can best be seen in FIGURE 3 of the drawings, a plurality of movable platforms 52 are mounted on the base frame, between the lower plate 12 and the top plate 14. Each platform 52 is provided with a cam follower 54 which rides in cam track 48, as shown. Also, each platform 52 is provided with upper and lower bearings 56 which surround guide bars 58 fixed between lower plate 12 and upper plate 14. This is best shown in FIGURE 4, to which reference will now be made for a description of the platforms 52.

As shown in FIGURE 4, each platform 52 comprises a top bar 60 and a bottom bar 62 which are spaced apart and secured together by sidewalls 64. As shown, bearings 56 are mounted in each of the top and bottom bars 60, and 62. These bearings 56 surround the fixed guide bars 58, which are fixed to both the top plate 14 and bottom plate 12 in any desired manner. The drawing indicates welding of the rods 58 to plates 12 and 14, but any other desired method of securing guide bars 58 may be used. As will be apparent, the platforms 52 may be moved in a vertical direction, riding on the fixed guide bars 58 by means of bearings 56. The vertical motion of the platform 52 will be determined by the cam track 48 and the dips 50 therein, as cam follower 54 of each platform 52 follows the contour of the cam track 48.

Each platform 52 carries one or more tines 66, which are spring mounted on the platform 52. Each tine 66 is spring mounted in a cylindrical chamber 68 of a tube which is fixed to top bar 60. Each tine 66 extends through guide spring 70 which is secured to the bottom bar 62 of the platform 52. The tine 66 also extends through a slot 72 in lower bar 62 and a similar slot 74 in the lower plate 12. These slots 72 and 74, as well as guide spring 70 allow limited movement of tine 66 in a horizontal direction during its movement into and out of the soil. The bottom end of each tine 66 is pointed, as at 76, and is provided with one or more blade members 78 which are curved about the lower end of tine 66, as is best shown in FIGURE 7. The blade member coacts with the spring mounting to provide a twisting or turning motion to tine 66 as it enters the soil. As will be described, the tine is fixed when it leaves the soil, the combined tine motion aiding in loosening the soil.

The preferred construction and mounting of the tines 66 in the platforms 52 can best be seen in FIGURE 5, to which reference will now be made. As shown in FIGURE 5, each tine 66 is secured, preferably by a threaded connection, to a plunger or connector member 80. The plunger 80 extends into chamber 68 and is provided with a fixed ring member 82 which prevents removal of plunger 80 from chamber 68. As can be seen from FIGURE 5, chamber 68 is secured to top bar 60 of platform 52, and includes a removable cap member 84 and a fixed base member 86. As can be seen base member 86 has a half round notch, complementary to a projection on ring member 82 on the plunger 80. The opening in base member 86 is such as to allow limited horizontal movement of tine 66, when plunger 80 is moved into chamber 68. A compression spring 88 is mounted in chamber 68, with one end against cap 84 and the other end against ring 82 on plunger 80. As can be seen, particularly from FIGURE 6, the complementary, half round notches or portions on ring 82 and base 86 mate with each other, providing a fixed connection when engaged, as in FIGURE 5, and a movable, rotatable connection when disengaged, as in FIGURE 6. When tine 66 is forced into the soil by the downward movement of platform 52 as its cam follower 54 follows the contour of cam track 48 into dip 50, spring 88 is compressed, disengaging parts 82 and 86. This allows a turning or twisting motion of tine 66 as blade 78 is forced into the soil. However, as the tine moves out of the soil on the upward movement of platform 52, spring 88 causes re-engagement of the parts 82 and 86, thus holding tine 66 and blade member 78 fixed as they are removed from the soil. This action of spring 88 can best be seen by comparing the position of parts in FIGURES 8 and 9. As shown, FIGURE 8 indicates the relation of the parts before the tine 66 enters the soil and as it is being withdrawn from the soil. FIGURE 9 indicates the relation as tine 66 is being driven into the soil. As can be seen in FIGURE 9, after the compression of spring 88, parts 82 and 86 are moved apart to allow the tine 66 to turn or twist. Of course, it will be apparent that serrations could be used in place of the single notch in the parts 82 and 86.

FIGURE 10 shows a modified form of platform, indicated as 52'. As there shown a single, rectangular guide bar member 58' is provided, fixed between plates 12 and 14. Platform 52' comprises a box-like member 64', fitting around guide bar 58'. An angle member 60' secured to the front of portion 64' has the chamber 68 mounted thereon, while cam follower 54 is mounted on a similar member at the rear of portion 64', as shown. This construction eliminates the need for bearings, providing a more economical structure.

As will be apparent, the spring mounting of tines 66 in the various chambers 68 will prevent damage to the individual tines 66 if a solid obstruction is contacted in the soil. If a tine 66 hits a solid object, the spring 88 will be further compressed, allowing plunger 80 to move further into chamber 68. This will relieve the downward force on the tine 66, preventing breakage. Also, if the obstruction is small, the spring mounting will allow the tine 66 to slide around the obstruction, due to the play provided by base 86 of chamber 68 and slots 72 and 74.

From the above description of the preferred embodiment of this invention it will be clear that there has been disclosed an aerator which fulfills all of the objects previously set forth. Obviously, it is possible to make many changes in the specific structural details set out.

What is claimed as new and which it is desired to secure by Letters Patent of the United States is:

1. An aerator comprising a base frame including upper and lower plate members, with wheels secured to said lower plate for moving said aerator, and motive means mounted on said base frame, the improvement which comprises:
   (a) a drum type member rotatably mounted on a vertical shaft journaled on said base frame and driven by said motive means,
      (1) a cam track on the periphery of said drum type member, being substantially horizontal in extent and having at least one dip therein,
   (b) a plurality of separate platforms movably mounted for individual vertical movement on individual guide members secured to said base frame,
      (1) each said platform being provided with a cam follower riding in said cam track, to reciprocate each said platform
      (2) and at least one spring-biased tine mounted on each said platform and movable both relative to and with said platform,
      (3) said spring mounting relieving downward pressure on said tine when said tine contacts an obstruction during downward movement of said platform.

2. An aerator as claimed in claim 1, in which said spring mounting comprises a chamber secured to said platform, a plunger portion of said tine extending into said chamber, said plunger portion having a ring member secured thereto within said chamber, at least one projection on the bottom of said ring member, a base on said chamber, said base having at least one notch thereon complementary with said projection on said ring member, and a compression spring around said plunger between said ring member and the upper end of said chamber.

3. A movable platform for use in an aerator device, said platform comprising:
   (a) a member adapted to be movably mounted on an aerator,
   (b) at least one tine spring-mounted on said member for movement therewith,
      (1) said tine having at least one blade member, curvedly mounted at the end thereof to provide twisting motion of said tine when entering soil,
   (c) a tube having a chamber secured to said member,
      (1) a plunger portion of said tine extending into said chamber and having a ring member secured thereto within said chamber, said ring member having at least one projecting portion,
      (2) a base on said chamber engageable with said ring member to prevent removal of said plunger from said chamber, said base having at least one notched portion complementary with said projecting portion of said ring member on said plunger, said complementary portions, when engaged preventing twisting motion of said tine,
   (d) a compression spring mounted about said plunger within said chamber between said ring member and the upper portion of said chamber.

References Cited

UNITED STATES PATENTS

| | | |
|---|---|---|
| 1,853,079 | 4/1932 | Plant. |
| 2,027,910 | 1/1936 | Herring. |
| 3,136,274 | 6/1964 | Townsend _____ 111—6 |

ROBERT E. PULFREY, Primary Examiner

J. W. PETERSON, Assistant Examiner

U.S. Cl. X.R.

172—91